(12) United States Patent
Chhowalla et al.

(10) Patent No.: US 10,989,177 B2
(45) Date of Patent: Apr. 27, 2021

(54) METALLIC MOLYBDENUM DISULFIDE NANOSHEETS-BASED ELECTROCHEMICAL ACTUATORS

(71) Applicant: Rutgers, The State University of New Jersey, New Brunswick, NJ (US)

(72) Inventors: Manish Chhowalla, Highland Park, NJ (US); Muharrem Acerce, Istanbul (TR); E. Koray Akdoğan, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 234 days.

(21) Appl. No.: 16/116,508

(22) Filed: Aug. 29, 2018

(65) Prior Publication Data

US 2019/0093640 A1   Mar. 28, 2019

Related U.S. Application Data

(60) Provisional application No. 62/551,540, filed on Aug. 29, 2017.

(51) Int. Cl.
*F03G 7/00* (2006.01)
*B82Y 30/00* (2011.01)

(52) U.S. Cl.
CPC .............. *F03G 7/005* (2013.01); *B82Y 30/00* (2013.01)

(58) Field of Classification Search
CPC ......... F02G 7/005; B82Y 30/00; H01M 12/00
See application file for complete search history.

(56) References Cited

U.S. PATENT DOCUMENTS 6,555,945 B1 * 4/2003 Baughman .............. F03G 7/005
                                                136/291
7,566,664 B2  7/2009 Yan et al.
(Continued)

FOREIGN PATENT DOCUMENTS

CA        2548858 A1   12/2006
CA        2665996 C     7/2015
(Continued)

OTHER PUBLICATIONS

Baughman, R. H. et al.: "Carbon Nanotube Actuators", Science, vol. 284, No. 5418, pp. 1340-1344 (May 21, 1999).
(Continued)

*Primary Examiner* — Cynthia H Kelly
*Assistant Examiner* — Monique M Willis
(74) *Attorney, Agent, or Firm* — Meagher Emanuel Laks Goldberg & Liao, LLP

(57) ABSTRACT

An actuator comprising a flexible substrate having a surface comprising one or more active regions, each of the active regions having disposed thereon an electrochemically active film comprising a plurality of 1T phase 2D MoS2 nanosheets which impart a first force upon the flexible substrate in response to electrochemical charging of ions in the 2D MoS2 nanosheets and impart a second force upon the flexible substrate in response to electrochemical discharging of ions in the 2D MoS2 nanosheets, wherein the first and second forces imparted to the flexible substrate each being sufficient to displace the flexible substrate. The flexible substrate may comprise a polymer substrate and the electrochemically active film may comprise a conductive layer having disposed thereon the plurality of 1T phase 2D MoS2 nanosheets.

20 Claims, 8 Drawing Sheets

(56) References Cited

U.S. PATENT DOCUMENTS

| | | |
|---|---|---|
| 2006/0055282 A1 | 3/2006 | Sekimura |
| 2019/0139713 A1* | 5/2019 | Choi .................. H01L 21/2855 |

FOREIGN PATENT DOCUMENTS

| | | |
|---|---|---|
| KR | 20130065276 A | 9/2013 |
| KR | 101580211 B1 | 12/2015 |

OTHER PUBLICATIONS

Zhang, Q. M. et al.: "Giant Electrostriction and Relaxor Ferroelectric Behavior in Electron-Irradiated Poly(vinylidene fluondetrifluoroethylene) Copolymer", Science, vol. 280, pp. 2101-2104 (Jun. 26, 1998).
Brochu, P. & Pei, Q.: "Advances in Dielectric Elastomers for Actuators and Artificial Muscles", Macromol. Rapid Commun. vol. 31, pp. 10-36 (2010).
Aliev, A E. et al.: "Giant-Stroke, Superelastic Carbon Nanotube Aerogel Muscles", Science vol. 323, pp. 1575-1578 (Mar. 20, 2009).
Biener, J. et al.: "Surface-chemistry-driven actuation in nanoporous gold", Nat. Mater. vol. 8, pp. 47-51 (Jan. 2009).
Y. Bar-Cohen: "Electroactive Polymer (EAP) Actuators as Artificial Muscles: Reality, Potential, and Challenges", Second Edition. (SPIE, 2004).
Mazzoldi, A & De Rossi, D.: "Conductive-polymer-based structures for a steerable catheter", in (ed. Bar-Cohen, Y.) 273 (2000). doi: 10.1117/12.387786; SPIE's 7th Annual International Symposium on Smart Structures and Materials, 2000, Newport Beach, CA, United States.
Barbarino, S., Bilgen, O., Ajaj, R. M., Friswell, M. I. & Inman, D. J.: "A Review of Morphing Aircraft", J Intell. Mater. Syst. Struct. vol. 22, pp. 823-877 (Jun. 2011).
Ma, M., Guo, L, Anderson, D. G. & Langer, R.: "Bio-Inspired Polymer Composite Actuator and Generator Driven by Water Gradients.", Science vol. 339, No. 6116, pp. 186-189 (Jan. 10, 2013).
Yun, Y. et al.: "A Multi-Wall Carbon Nanotube Tower Electrochemical Actuator", Nano Lett. vol. 6, No. 4, pp. 689-693 (2006).
Koyama, Y. et al.: "Harnessing the Actuation Potential of Solid-State Intercalation Compounds", Adv. Funct. Mater. vol. 16, pp. 492-498 (2006).
Lu, W. et al.: "Use of Ionic Liquids for pi-Conjugated Polymer Electrochemical Devices", Science vol. 297, pp. 983-987 (Aug. 9, 2002).
Pei, Q. & Inganaes, O.: "Electrochemical applications of the bending beam method. 1. Mass transport and volume changes in polypyrrole during redox", J Phys. Chem. vol. 96, pp. 10507-10514 (1992).
Shahinpoor, M., Bar-Cohen, Y., Simpson, J. O. & Smith, J.: "Ionic polymer-metal composites (IPMCs) as biomimetic sensors, actuators and artificial muscles—a review", Smart Mater. Struct. vol. 7, R15-R30 (1998).
Jin, H.-J. et al.: "Nanoporous Au—Pt Alloys As Large Strain Electrochemical Actuators", Nano Lett. vol. 10, pp. 187-194 (2010).
Spinks, G. M., Mottaghitalab, V., Bahrami-Samani, M., Whitten, P. G. & Wallace, G. G.: "Carbon-Nanotube-Reinforced Polyaniline Fibers for High-Strength Artificial Muscles", Adv. Mater. vol. 18, pp. 637-640 (2006).
Cheng, C. & Ngan, A H. W.: "Reversible Electrochemical Actuation of Metallic Nanohoneycombs Induced by Pseudocapacitive Redox Processes", ACS Nano vol. 9, No. 4, pp. 3984-3995 (2015).
Gu, G. et al.: "V2O5 nanofibre sheet actuators", Nat. Mater. vol. 2, pp. 316-319 (May 2003).
Weissmuller, J.: "Charge-Induced Reversible Strain in a Metal", Science vol. 300, pp. 312-315 (Apr. 11, 2003).
Chin, T. E., Rhyner, U., Koyama, Y., Hall, S. R. & Chiang, Y.-M.: "Lithium Rechargeable Batteries as Electromechanical Actuators", Electrochem. Solid-State Lett. vol. 9, A134-A138 (2006).
Cooper, R. C. et al.: "Nonlinear elastic behavior of two-dimensional molybdenum disulfide", Phys. Rev. B 87, (2013).
Come, J. et al.: "Controlling the actuation properties of MXene paper electrodes upon cation intercalation", Nano Energy vol. 17, pp. 27-35 (2015).
Acerce, M., Voiry, D. & Chhowalla, M.: "Metallic 1 T phase MoS2 nanosheets as supercapacitor electrode materials", Nat. Nanotechnol. vol. 10, pp. 313-318 ( Apr. 2015).
Feng, P., Bu, X. & Zheng, N.: "The Interface Chemistry between Chalcogenide Clusters and Open Framework Chalcogenides", Acc. Chem. Res. vol. 38, No. 4, pp. 293-303 (2005).
Du, P., Lin, X. & Zhang, X.: "A multilayer bending model for conducting polymer actuators", Sensors and Actuators A: Physical, vol. 163, pp. 240-246 (2010).
Come, J. et al.: "Nanoscale Elastic Changes in 2D Ti3C2Tx (MXene) Pseudocapacitive Electrodes", Adv. Energy Mater. vol. 6, 1502290 (2016).
Ge, Y. et al.: "A robust free-standing MoS2 /poly(3,4-ethylenedioxythiophene): poly(styrenesulfonate) film for supercapacitor applications", Electrochimica Acta vol. 235, pp. 348-355 (2017).
Kemiao Jia, Pal, S. & Huikai Xie.: "An Electrothermal Tip-Tilt-Piston Micromirror Based on Folded Dual S-Shaped Bimorphs", J Microelectromechanical Syst. vol. 18, No. 5, pp. 1004-1015 (Oct. 2009).
Otero, T. F., Cortes, M. T. & Boyano, I.: "Macroscopic devices and complex movements developed with artificial muscles", Proc. SPIE 4695, Smart Structures and Materials: Electroactive Polymer Actuators and Devices (EAPAD), 395 (ed. Bar-Cohen, Y.) 395-402 (2002). doi:10.1117/12.475186.
Ham, R., Sugar, T., Vanderborght, B., Hollander, K. & Lefeber, D.: "Compliant actuator designs", IEEE Robot. Autom. Mag. vol. 16, pp. 81-94 (2009).
Eda, G. et al.: "Photoluminescence from Chemically Exfoliated MoS2", Nano Lett. vol. 11, pp. 5111-5116 (2011).
S. Timoshenko, J.N. Goodier: "Theory of Elasticity," McGraw-Hill Book Company, 1951.
I.S. Sokolnikoff, "Mathematical Theory of Elasticity," McGraw-Hill Book Company, New York 1946.
Klein, C. A: "How accurate are Stoney's equation and recent modifications", J Appl. Phys. 88, 5487 (2000).
Stoney, G. G.: "The Tension of Metallic Films Deposited by Electrolysis.", Proc. R. Soc. Math. Phys. Eng. Sci. 82, 172-175 (1909).
Jimenez Sandoval, S., Yang, D., Frindt, R. & Irwin, J. C.: "Raman study and lattice dynamics of single molecular layers of MoS2", Phys. Rev. B, vol. 44, No. 8, pp. 3955-3962 (1991).
Calandra, M.: "Chemically exfoliated single-layer MoS2: Stability, lattice dynamics, and catalytic adsorption from first principles", Phys. Rev. B 88, 245428 (2013).
Pelrine, R. et al.: "High-Speed Electrically Actuated Elastomers with Strain Greater Than 100%", Science, vol. 287, pp. 836-839 (2000).
Haines, C. S. et al.: "Artificial Muscles from Fishing Line and Sewing Thread", Science vol. 343, pp. 868-872 (2014).
Hara, S., Zama, T., Takashima, W. & Kaneto, K.: "Artificial Muscles Based on Polypyrrole Actuators with Large Strain and Stress Induced Electrically", Polym. J, vol. 36, No. 2, pp. 151-161 (2004).
Foroughi, J. et al.: "Torsional Carbon Nanotube Artificial Muscles", Science, vol. 334, pp. 494-497 (2011).
Mirfakhrai, T. et al.: "Electrochemical actuation of carbon nanotube yarns", Smart Mater. Struct. 16, S243-S249 (2007).
Xie, X., Bai, H., Shi, G. & Qu, L.: "Load-tolerant, highly strain-responsive graphene sheets", J Mater. Chem. 21, 2057 (2011).
Hongxiang Jia, "Molybdenum Disulfide-Conducting Polymer Composite Structures for Electrochemical Biosensor Applications" Graduate Theses and Dissertations, 2016.
R. Kappera et al.: "Figure 1: 1T and 2H phases of MoS2.", Nature Materials vol. 13, pp. 1128-1134, 2014.
M. Chhowalla et al.: "Phase-engineered transition-metal dichalcogenides for energy and electronics" Mrs Bulletin, vol. 40, pp. 585-591, 2015.

* cited by examiner

METALLIC MOLYBDENUM DISULFIDE NANOSHEETS-BASED ELECTROCHEMICAL ACTUATORS

CROSS-REFERENCE TO RELATED APPLICATION

This application claims the benefit of and priority to prior filed Provisional Application Ser. No. 62/551,540, filed Aug. 29, 2017, entitled METALLIC MOLYBDENUM DISULFIDE NANOSHEETS-BASED ELECTROCHEMICAL ACTUATORS, which provisional patent application is incorporated herein by reference in its entirety.

FIELD OF THE DISCLOSURE

The present invention relates generally to electrochemical actuators and, more particularly, to metallic molybdenum disulfide nanosheets-based electrochemical actuators.

BACKGROUND

Actuators that convert electrical energy to mechanical energy are useful in a wide variety of electromechanical systems and robotics. Actuation systems based on heating carbon nanotube electrodes or solvent adsorption/desorption, electrochemically induced carbon nanotube electrodes, graphite electrodes, polymer electrodes, and metals have been reported.

Electroactive polymers have also been studied for actuation over the past few decades, however the stress generation of polymers has remained low due to their low modulus in general, though mechanical performance as well as work density at low rates can be increased by incorporating CNTs into conjugated polymers. Recent studies with Au—Pt nanoporous metals have revealed exceptionally high strains, but such high strains were achieved at relatively low frequencies (0.00025 Hz) and such actuator materials are expensive. The use of abundant materials such as metallic NiOOH and $V_2O_5$ fibers can mitigate the cost of metallic actuators, though the actuation performance of NiOOH and $V_2O_5$ actuators depends on the crystallographic orientation of the material.

SUMMARY

The present invention is directed to various actuators and respective methods of construction utilizing multiple metallic $MoS_2$ sheets, where ion intercalation and de-intercalation is fast and efficient and utilized for actuation.

An embodiment of an actuator comprises a flexible substrate having a surface comprising one or more active regions, each of the active regions having disposed thereon an electrochemically active film comprising a plurality of 1T phase 2D $MoS_2$ nanosheets which impart a first force upon the flexible substrate (e.g., a polymer or polyimide film such as Dupont's Kapton) in response to electrochemical charging of ions in the 2D $MoS_2$ nanosheets and impart a second force upon the flexible substrate in response to electrochemical discharging of ions in the 2D $MoS_2$ nanosheets, wherein the first and second forces imparted to the flexible substrate being sufficient to displace the flexible substrate. The flexible substrate may comprise a conductive substrate. The flexible substrate may comprise a polymer substrate and the electrochemically active film may comprise a conductive layer having disposed thereon the plurality of 1T phase 2D $MoS_2$ nanosheets.

An embodiment of a compound actuator comprises a plurality of actuators arranged to impart a desired force upon an object, each of the actuators comprising a substrate having a surface comprising one or more active regions, each of the active regions having disposed thereon an electrochemically active film comprising a plurality of 1T phase 2D $MoS_2$ nanosheets, at least one of the substrate and the plurality of 1T phase 2D $MoS_2$ nanosheets in mechanical communication with the object; the electrochemically active film imparting a first force upon the object in response to electrochemical charging of ions in the 2D $MoS_2$ nanosheet; the electrochemically active film imparting a second force upon the object in response to electrochemical discharging of ions in the 2D $MoS_2$ nanosheet.

When immersed in an electrolyte solution (or electrochemically cooperating with a solid, semi-solid, slurry or liquid electrolyte), the electrochemically active film is intercalated in its inter-nanosheet spaces with both anions and cations, but when the conducting substrate switches between being a cathode and an anode, the intercalating ion species also switches between cations and anions. The expansion can occur via intercalation of anions or simply removal of positively charged ions that would cause the negatively charged sheets to repel and the electrode to expand. For example, intercalating of positively charged cations in between nanosheets pulls negatively-charged nanosheets closer together and leads to the contraction of the electrochemically active film, the force of which causes bending of the substrate in one or more directions. Similarly, intercalating of negatively charged anions in between nanosheets pushes negatively-charged nanosheets farther apart and leads to the expansion of the electrochemically active film, the force of which causes bending of the substrate in the reverse of the one or more directions.

DETAILED DESCRIPTION

Figure 1:
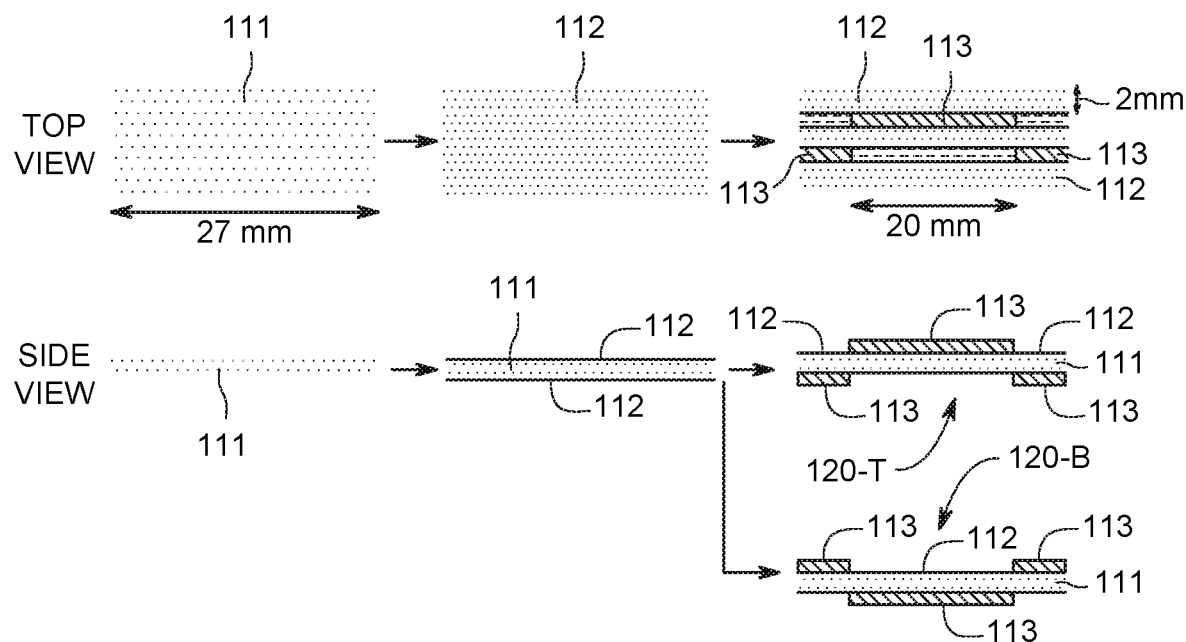
FIG. 1 graphically depicts a schematic and method of fabricating exemplary Inverted-Series-Connected (ISC) Bimorph actuator portions in accordance with an embodiment.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It must be noted that as used herein and in the appended claims, the singular forms "a", "an", and "the" include plural referents unless the context clearly dictates otherwise.

Various embodiments contemplate actuators capable of generating a force and performing work in response to a dynamic expansion and contraction of films made from nanosheets of metallic two dimensional 1T phase $MoS_2$. The inventor has demonstrated actuators so constructed that generate mechanical forces that are capable of lifting masses that are >150 times heavier than the corresponding actuator weight over several millimeters and for hundreds of cycles. Specifically, the $MoS_2$ films are able to generate mechanical stress of approximately 17 MPa, which stress is higher than mammalian muscle (~0.3 MPa) and comparable to that of ceramic piezoelectric actuators (~40 MPa). In addition, the $MoS_2$ films are able to generate mechanical strain of approximately 0.6±0.2%, and do so while operating at frequencies up to 1 Hz. The corresponding work density at 0.005 Hz is 60 kJ/m3 and at 0.125 Hz is 30 kJ/m3. The actuation performance is attributed to the high electrical conductivity of metallic 1T phase of $MoS_2$ nanosheets, elastic modulus of restacked $MoS_2$ layers (illustratively, 2-4 GPa) and fast proton diffusion between the nanosheets.

When immersed in an electrolyte solution, the electrochemically active film is intercalated in its inter-nanosheet spaces with both anions and cations, but when the conducting substrate switches between being a cathode and an anode, the intercalating ion species also switches between cations and anions. The expansion can occur via intercalation of anions or simply removal of positively charged ions that would cause the negatively charged sheets to repel and the electrode to expand. For example, intercalating of positively charged cations in between nanosheets pulls negatively-charged nanosheets closer together and leads to the contraction of the electrochemically active film, the force of which causes bending of the substrate in one or more directions. Similarly, intercalating of negatively charged anions in between nanosheets pushes negatively-charged nanosheets farther apart and leads to the expansion of the electrochemically active film, the force of which causes bending of the substrate in the reverse of the one or more directions.

$MoS_2$ Thin Film Preparation

Various embodiments contemplate actuators formed using $MoS_2$ thin films of different sizes and shapes. These $MoS_2$ thin films may be created using any one of several techniques.

As a simple example, a chemically exfoliated monolayer $MoS_2$ may be synthesized by organo-lithium chemistry wherein lithium intercalation into bulk $MoS_2$ powder followed by exfoliation in deionized water. Illustratively, 4 mL butyl-Lithium and 20 ml hexane added on 0.4 g of bulk $MoS_2$ powder under argon is then heated up at reflux for 3 days. The mixture is then cooled and filtered with extra hexane (5×25 mL) to remove the excess of lithium and organic residues. The lithiated $MoS_2$ powder ($Li_xMoS_2$) is then mixed with DI water at a ratio of 1.5 mg/mL and subsequently exfoliated. The solution is sonicated for approximately one hour to agitate the exfoliation, and centrifuged several times to remove lithium cations as well as the non-exfoliated materials.

$MoS_2$ thin films may be prepared by filtering the suspended chemically exfoliated single layer $MoS_2$ nanosheets over nitrocellulose membranes (e.g., Millipore, 25 nm pore size) and then transferred onto a 100 nm gold coated substrate (e.g., 25 μm, 50 μm or 125 μm polyimide). The thickness of the restacked 1T $MoS_2$ film may be controlled by the volume of the $MoS_2$ solution. In various experiments, thicknesses were measured by cross-sectional scanning electron microscopy in which 100 measurements per sample were made, finding the sample to be: 1±0.1 μm, 2±0.2 μm, 3±0.1 μm, 4±0.1 μm, and 8±0.2 μm. Finally, the membrane may be dissolved in acetone and restacked $MoS_2$ dried in vacuum for a week. For bilayer film ($MoS_2$/gold), an additional sacrificial layer of PMMA may be coated on the substrate before gold deposition which is dissolved in acetone. Other techniques may also be used, such as using layer by layer assembly, spray coating, dip coating, spin coating, ion assisted directed assembly, and casting.

Various embodiments contemplate actuators that lift loads that are 150 times their weight. These actuators may be constructed for many different purposes and in accordance with many different structures. For example, actuators according to the various embodiments may be used to perform work by lifting, pushing, pulling and so on. Such actuators may be used to change the shape or surface curvature of objects such as wings on aircrafts, drones, wind turbines. Such actuators may be used to place objects in and out of place—for example for opening and closing of valves, steering catheters and so on. Such actuators may be used for artificial muscles for use in robotics. Numerous applications are contemplated.

When selecting a substrate for an actuator, many substrates (including no substrate) are envisioned. Various embodiments contemplate the use of flexible substrates such as to inhibit movement/work except in a desired direction/manner. However, the actuators can be either on a flexible substrate or free standing (i.e., no substrate). When in substrate, the substrate should be flexible to allow actuation. The substrate itself may be the object to be actuated, such as a fluid directing surface (e.g., a wing) or a catheter to be steered within a body. In such applications, the 1T 2D $MoS_2$ film may be directly mounted upon the component to be actuated.

When selecting an actuating material for an actuator, many actuating materials are envisioned. Various embodiments contemplate the use of several actuating materials. The actuators may be comprised of 2D metallic nanosheets that demonstrate the maximum the charging and discharging of ions. In this specification the various embodiments are described primarily within the context of metallic $MoS_2$ nanosheets. However, $MoS_2$ belongs to a family of around 40 compounds called transition metal dichalcogenides (TMDs) and, therefore, it is contemplated that metallic nanosheets formed using one or more of these other TMDs may also be used. In addition to metallic nanosheets of TMDs, there other families of metallic 2D nanosheets such as MXenes that also show excellent charge storage and discharge properties. Therefore, it is contemplated that metallic nanosheets formed using one or more of the MXenes may also be used to realize various types of actuators according to the embodiments.

Generally speaking, the 1T 2D nanosheets used to form the actuators described herein are exfoliated from parent bulk phase in suspension and then assembled into films to realize the ion storage and discharge material. This process may be used for TMDs and MXenes to form the appropriate 1T 2D nanosheets which are then stacked to form the electrochemically active film used to build the actuators contemplated herein.

When selecting an electrolyte material for an actuator, many electrolyte materials are envisioned. Various embodiments contemplate the use of several electrolytes. Generally speaking, almost any ion containing electrolyte with pH ranging from 14 to 1 can be used as the electrolyte. The inventor has demonstrated actuation with electrolytes containing $H^+$, $Li^+$, $K^+$, and $Na^+$ but other ions will lead to similar actuation results. Further, while the inventor has demonstrated and primarily described herein actuation in liquid electrolytes, an actuator based on solid, slurry, liquid or semi-solid electrolytes is also contemplated in various embodiments.

Various embodiments contemplate a fully working actuator including a liquid electrolyte that is be completely encased like a battery or a supercapacitor device so that either or both of solid or liquid electrolytes may be used. Various embodiments contemplate a fully working actuator that is not completely encased, or that is operable in a fluid environment (e.g., ocean, human or animal body etc.) that itself serves as an electrolyte for this disclosed process.

Various actuators may be formed using active materials that are freestanding, on flexible conducting substrates, on a conductive layer of a non-conducting substrate and/or any combination thereof. Further, the term "flexible" as used herein is intended to denote a material able to move in some way in response to a force generated by an actuator such that the actuator performs some amount of work (flexing, bending, pushing, pulling etc. in response to the force). The work may comprise moving the substrate (and/or object attached thereto), moving a portion of the substrate (and/or object attached thereto), moving the actuator (and/or object attached thereto), changing a shape of an object attached to the substrate or actuator and so on. As such, the term flexible substrate is intended to be broadly interpreted as the film-like materials (e.g., Kapton) disclosed in the figures capable of curling up or bending, or slightly flexible objects such as metal wings on an aircraft.

Various embodiments contemplate multiple and/or compound actuators formed using a plurality of individual actuators formed in accordance with the embodiments described herein. For example, a larger and more powerful actuator may be formed using a plurality of individual actuators (sub-actuators in this context) such as to provide strength and scale to accomplish a larger amount of work that otherwise available to an individual actuating element. Such an actuator find utility within multiple environments, such as pumping mechanisms, lifting mechanisms, bending mechanisms, valve control and other mechanisms. For example, a large surface such as a wing may have multiple actuators disposed therein to impart respective forces thereto such that the shape of the wing (e.g., aerodynamic profile) is controllably adapted to achieve a beneficial aerodynamic effect (reduce turbulence, retain slipstream air and so on). Such multiple actuators may comprise relatively few powerful actuators and/or many less powerful actuators.

Inverted-Series-Connected (ISC) Bimorph Actuation Example

Figure 2:
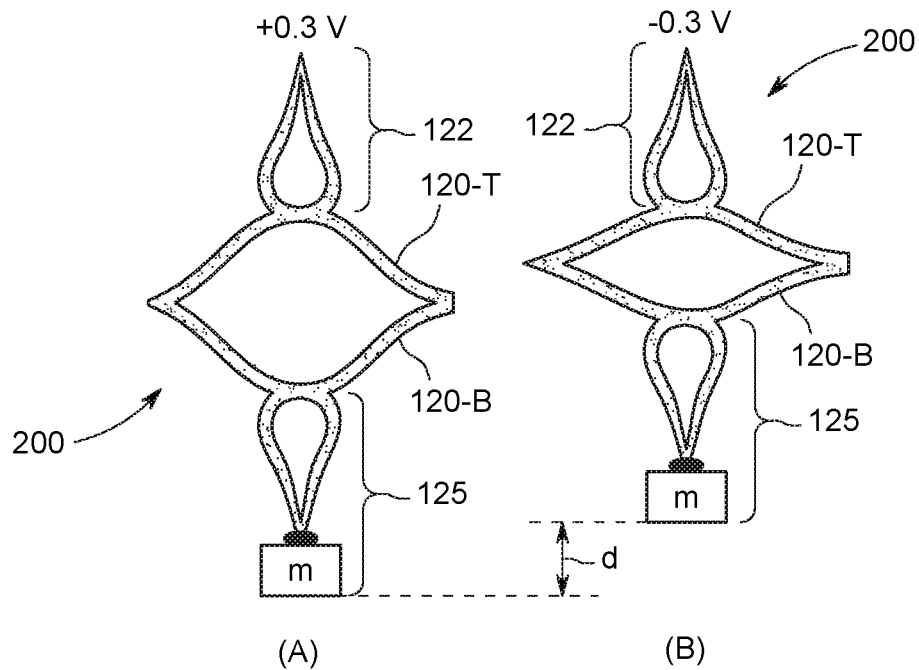
FIG. 2 depicts an exemplary ISC actuator including metallic $MoS_2$ nanosheet electrodes formed in accordance with the method of FIG. 1.

FIG. 1 graphically depicts a schematic and method of fabricating exemplary ISC actuator portions in accordance with an embodiment, and FIG. 2 depicts an exemplary ISC actuator including metallic $MoS_2$ nanosheet electrodes formed in accordance with the method of FIG. 1. FIGS. 1-2 will be discussed simultaneously.

The ISC actuator 200 of FIG. 2 comprises an upper portion 120-T and a lower portion 120-B, each portion being formed by depositing a 100 nm thin gold layer 112 on both sides of respective 27 mm by 8 mm strips of 25 μm thick Kapton tape 111. The gold coated Kapton tape is cut into four pieces as illustrated to form interconnected gold electrode strips of dimension 2 mm×25 mm. After which, 4 μm $MoS_2$ film 113 is transferred on the designated areas on both sides of the strips, as clearly depicted in the respective side views of the strips 120-T and 120-B shown in FIG. 1.

FIG. 2 depicts an ISC actuator 200 formed by attaching the two ends the strips 120-T and 120-B such that the $MoS_2$ film deposited upon the strips 120 faced outward. As depicted in FIG. 2, a weight 125 is attached to lower portion 120-B while upper portion 120-T is attached to a voltage source via a conductor 122.

In various experiments, an assembled ISC bimorph actuator 200 with a 265 mg weight attached is immersed in a 0.5M $H_2SO_4$ electrolyte. The ISC bimorph actuator 200 is shown at an equilibrium position (leftmost image (A) of FIG. 2) at open circuit voltage of +0.3 V applied, and shown as lifting the 265 mg weight to a height of 3.6 mm (rightmost image (B) of FIG. 2) at open circuit voltage of −0.3 V applied.

Various embodiments include a macroscopic actuation device the mechanism of which is the insertion and removal of cations between nanosheets of two dimensional (2D) 1T phase $MoS_2$ (See FIG. 5) under electrochemical induction of, illustratively, +0.3 to −0.3V. Two dimensional materials such as $MoS_2$ nanosheets have high surface to volume ratio, enabling high amount of electrochemical charge storage. The stored electrochemical charge, which affects the interatomic bonds and the distance between atoms via double layer formation, ion intercalation or Faradaic reaction, reconfigures the space-charge region in the vicinity of the electrode/electrolyte interface. This sort of intercalation mechanism to induce expansion has previously been demonstrated in graphite battery electrodes, with strain and energy density values of 6.7% and 670 kJ-m-3, respectively, under pre-stress loading of 10 MPa being achieved in electrochemical cells comprising of $LiCoO_2$ cathodes and bulk micromachined highly oriented pyrolytic graphite (HOPG) anodes. Expansion occurred because of synergistic expansion of both the cathode and anode during delithiation and lithiation, respectively, giving an energy density of 1.3 MJ m-3 and strain values of 1.8% under 100 MPa applied load along with strains of 1% at frequencies of 6.7 mHz under 2 MPa loading in a fully packaged 740 mAh packaged Li-ion battery. However, the expansion of the electrodes occurs at high voltages (3.0-4.5 V) and while this expansion could be used for actuation, no working actuator was reported. Following up this work, Chin et al. demonstrated that expansion of graphite electrodes can lead to strains of up to 3% at zero stress values and 1% at 5 MPa with operation frequency of 10 mHz.

Figure 3:
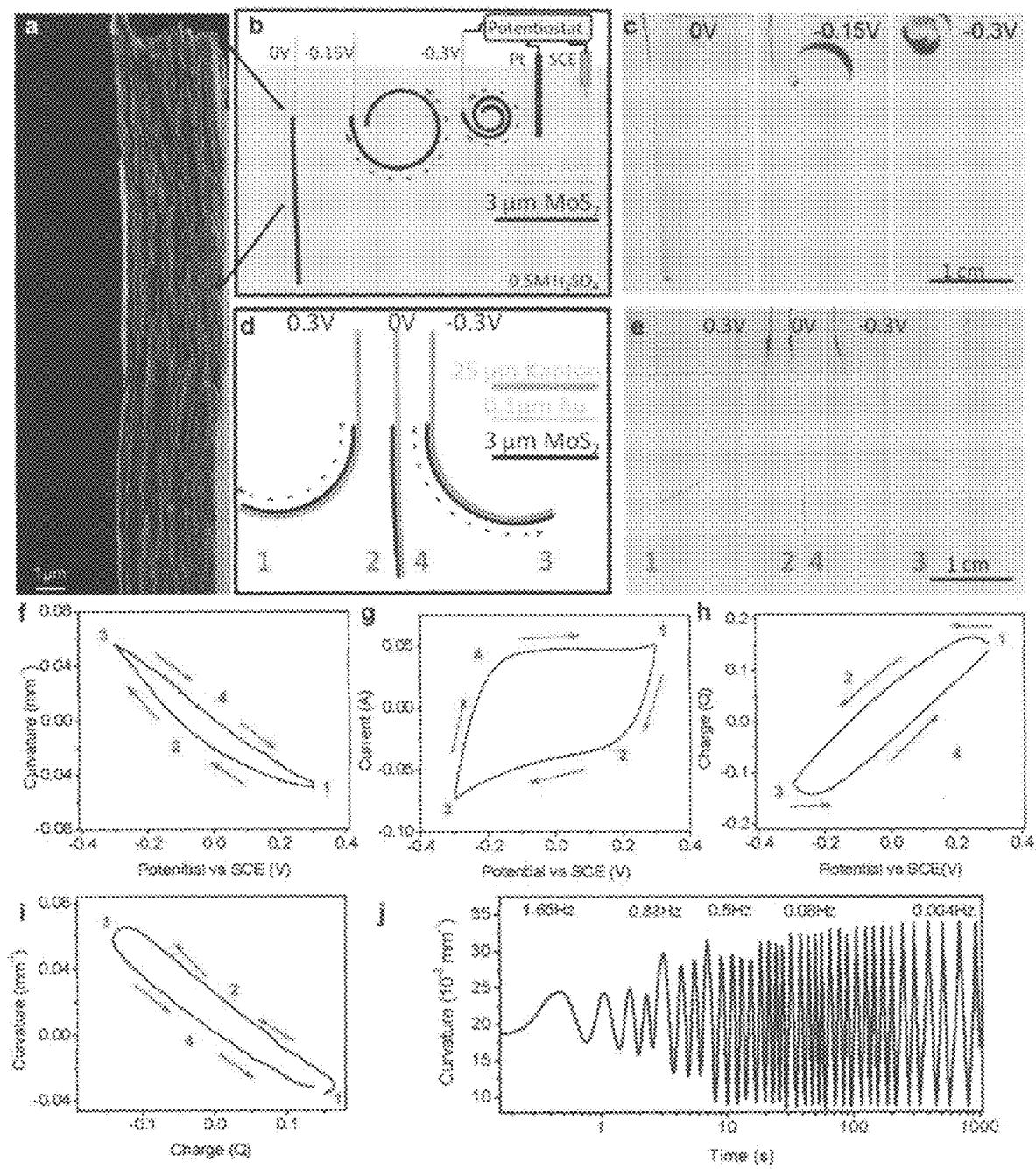
FIG. 3 graphically depicts characteristics and use of metallic $MoS_2$ films.
Figure 6:
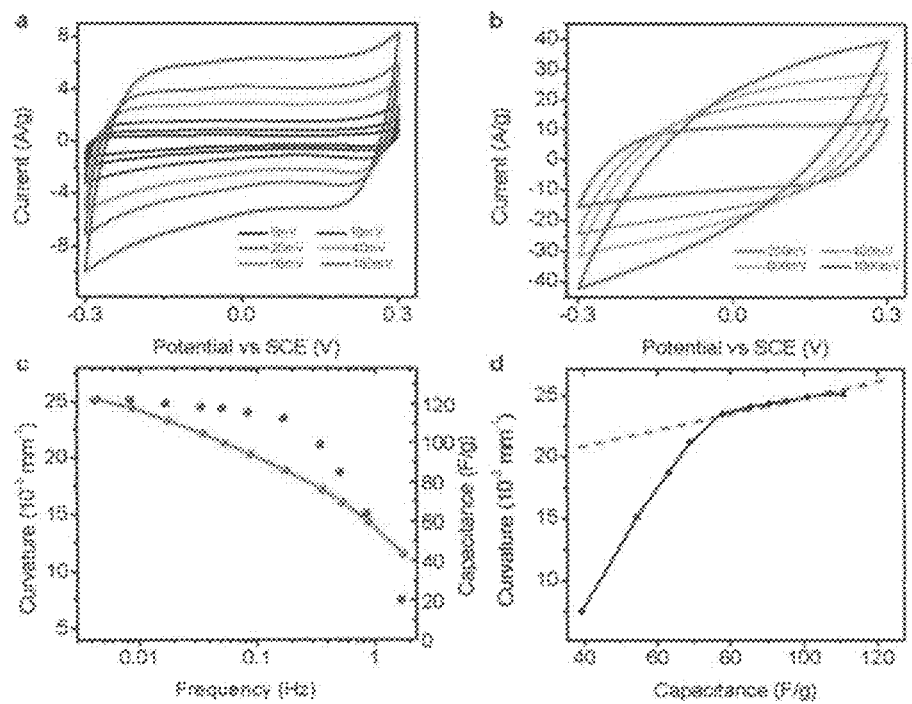
FIG. 6 graphically depicts a relationship between capacitance and curvature of an actuator according to one embodiment.
Figure 7:
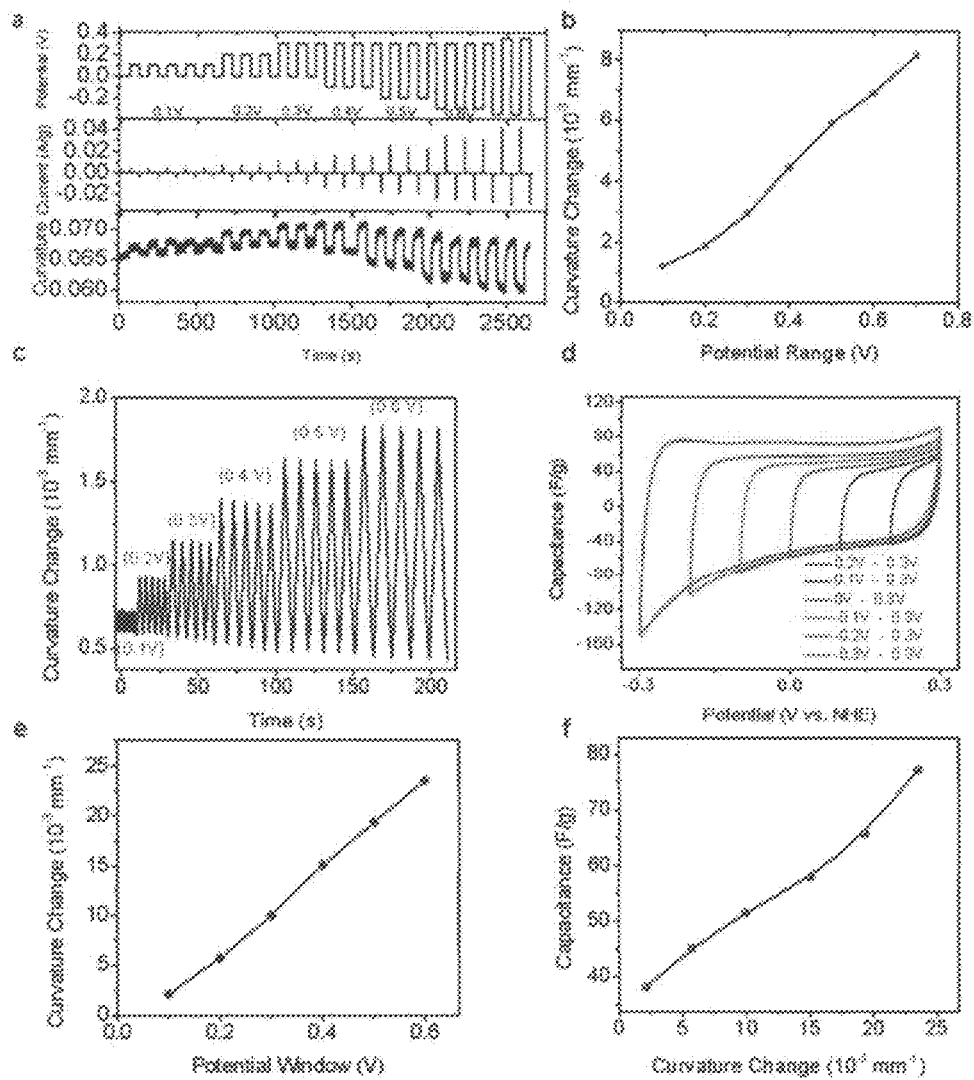
FIG. 7 graphically depicts the influence of electrochemical parameters on curvature of an actuator according to one embodiment.

Actuation with metallic $MoS_2$ films is fully reversible and highly stable over a broad frequency range which can be controlled with potential and scan rate (see FIGS. 3, 6 and 7). The reversible bending in both directions of a Kapton beam coated with 1T phase $MoS_2$ nanosheets, shown in FIG. 3, is attributed to the strain induced by expansion and contraction of the $MoS_2$ film. The actuation can be explained by assuming quasi-static conditions in which the elastic strain represents the ratio of change in length due to expansion or contraction of the $MoS_2$ film length. Briefly, the actuator is comprised of an electrochemically active film (1T $MoS_2$) that is deposited on a much thicker substrate (the Kapton beam in this case). The whole device is immersed in $H2SO4$ electrolyte. Therefore, the state of stress in the 1T-$MoS_2$ film is plane stress. In other words, the out-of-plane stress is zero because there are no traction forces on a free surface, i.e. $\sigma\perp=0$, while the in-plane stress is not zero because of the traction forces at the film-substrate interface, i.e. $\sigma_\|\neq 0$. Here, there is in-plane isotropy and all shear stresses vanish since the 1T $MoS_2$ nanosheets are randomly oriented in the plane of the film. However, none of the normal strains are zero, i.e. $\varepsilon_\perp\neq 0$ and $\varepsilon_\|\neq 0$. Under plane stress conditions, $\varepsilon_\perp$ and $\varepsilon_\|$ are related by $\varepsilon_\perp=-2(E_\|/E_\perp)\varepsilon_\|$, where $E_\|$ and $E_\perp$ are the in-plane and out-of-plane elastic moduli, respectively. In this study, the inventor obtained the $E_\perp$ by nanoindentation (See FIG. 8), while $E_\|$ was obtained from the curvature data in conjunction with the beam theory model (see FIG. 9 and discussion herein pertaining to a beam bending mechanism). In materials physics, the elastic compliance $S_{ij}$ (i,j range from 1 to 6) is the reciprocal tensor element of the corresponding modulus of elasticity $E_{ij}$ so that $E_{ij}=1/S_{ij}$. Hence, Poisson's ratio is related to the appropriate longitudinal and transverse moduli of elasticity based on first principles, but is expressed as the ratio of transverse strain to longitudinal strain. In this case, the ratio ($\varepsilon_\|/\varepsilon_\perp$) is the approximate Poisson's ratio of the 2D $MoS_2$ nanosheets, which has been established to be $\upsilon\cdot 0.3$.

When the actuator is immersed in the electrolyte, the intercalating species diffuse into the 1T $MoS_2$ film through all surfaces that are in contact with the solution. The intercalation causes charge screening between the 1T $MoS_2$ sheets, affecting the bond strengths and thereby the inter sheet separation. The film contracts in the out-of-plane direction; i.e. the out-of-plane strain is compressive ($\varepsilon_\perp<0$), because the positively charged intercalating species pull the negatively charged nanosheets closer together. A similar phenomenon has been demonstrated and confirmed by in-situ x-ray diffraction measurements in other 2D nanosheets. The contraction, which is perpendicular to the normal surface of the film, is accompanied by an expansion in the plane of the coating, i.e. $\varepsilon_\|>0$. Due to the traction forces at the 1T $MoS_2$ film-substrate interface and the geometry of the actuator, the tensile in-plane strain ($\varepsilon_\|>0$) causes a torque around the base of the actuator, resulting in a net upward displacement that is proportional with the extent of intercalation (ultimately reaching saturation). The high charge storage capacity of 1T $MoS_2$ accommodates larger amounts of ion flux into the film, resulting in higher electrochemical actuation behavior. A linear relationship was found between actuation and potential window (See FIG. 7).

During negative potential sweeping, cations are intercalated between—and also adsorbed onto—the $MoS_2$ nanosheets. During positive potential sweep, the protons are removed from the $MoS_2$ film. The amount of ion movement can be calculated from the measured current and the corresponding curvature change can be correlated with it. The curvature change and the amount of charge flow changes linearly with respect to the applied potential as shown in FIGS. 3H, 3I and 3J. The curvature change and specific capacitance slightly decrease with increasing frequencies as shown in FIG. 6C. The curvature also varies linearly with specific capacitance as shown in FIG. 6D. The actuation can thus be explained by the high conductivity of 1T phase as well as high ionic diffusivity in restacked $MoS_2$ nanosheets due to large anionic polarizibility. This phenomena enables high actuation performance even at high frequencies compared to other electroactive materials governed by pseudo-capacitive or adsorbate-induced actuators.

Mechanical models for multilayer actuators provide useful methods for calculating the elongation (approximated as the effective strain) and elastic modulus of the actuator material. According to beam bending theory, the induced-strain is related to the observed curvature by, $$\kappa = \frac{1}{R} = c_k \varepsilon,$$

where R is the radius of curvature, $\varepsilon$ is the strain and $c_k$ is dependent on the elastic moduli and thicknesses of the actuating layer and the beam. By changing the thicknesses of $MoS_2$ film and the beam, it is possible to obtain specific $c_k$ coefficients. The thicknesses and elastic modulus of the polyimide (Kapton) beam are known but the modulus of restacked $MoS_2$ nanosheets has not been experimentally measured. As such, by measuring the curvature of the Kapton beams of different thicknesses with different $MoS_2$ film electrode thicknesses as shown in FIG. 4A, it is possible to plot the effective strain as a function of elastic modulus (FIGS. 4B and 4C). By assuming that the effective strain and elastic modulus of the $MoS_2$ do not change with thickness of the film (as supported by the nanoindentation results that yield almost identical moduli values for the 3 μm and 8 μm films), i.e. no gradients in composition upon intercalation, the point at which the curves in FIGS. 4B and 4C cross represent the real values of the effective strain and elastic modulus. It can be seen that the restacked 2D 1T phase $MoS_2$ nanosheets have and in-plane elastic modulus ($E_\|$) ranging from 2-4 GPa and strain values of up to 0.8% (or average values of 0.6±0.2%). Based on these measurements and following the Hooke's Law, the strength of the material is estimated to be 17 MPa. This generated stress from charge induced 1T $MoS_2$ is much larger than mammalian muscle (0.3 MPa) and comparable to piezoelectric materials (40 MPa). In addition, the actuation is stable for up to three days as shown in FIG. 4D.

To substantiate the model, the inventor utilized nanoindentation to measure the modulus of 1T $MoS_2$ films in the charged, discharged, and dry states. The inventor found that the modulus of the film changes during charging and discharging, as also found in other 2D materials[26]. It should be noted that the elastic modulus obtained by nanoindentation is the out-of-plane modulus designated as ($E_\perp$), which is very approximately related to the in-plane modulus ($E_\|$) via the Poisson's ratio ($\upsilon$) as $E_\parallel \sim (\upsilon) E_\perp$. For $MoS_2$, the Poisson's ratio is well established as $\upsilon \sim 0.3$ (Ref[21]). Taking $E_\perp = 8.4$ GPa found from nanoindentation for the charged film, one obtains $E_\parallel \sim 2.5 \pm 0.1$ GPa, which is in agreement with actual tensile test results and what the model predicts for $E_\parallel$ based on beam bending mechanics.

The performance of electrochemical actuators is characterized by the work density per cycle that is generally determined by the product of elastic modulus and square of the strain; i.e.

$$\frac{1}{2} Y_{eff} \varepsilon_{max}^2.$$

Using this relationship, the work density for freely actuated $MoS_2$ films—that is, without being attached to a Kapton substrate—is calculated as 46 kJ/m³ and 81 kJ/m³ for strains of 0.6% and 0.8%, respectively. To investigate whether the actuation properties of 1T $MoS_2$ can be translated into a working device, the inventor designed an inverted-series-connected (ISC) bimorph actuator shown in FIG. 1. ISC bimorph actuators consist of two bimorph beams attached end to end where active actuator films are applied to opposite sides of the beams as shown in FIGS. 1 and 2. This enables each bimorph actuator to curve with an equal magnitude to cancel out rotational angle of each so that pure vertical displacement can occur. In other words, the ISC configuration enables one to amplify the axial displacement by taking advantage of deformation geometry, which, in turn is controlled by the shape of the actuator. With this configuration, under fixed load, the ISC actuator behaves like an elliptic spring and is considered as a single piece, passive compliant actuator with no moving parts. The inventor applied 4 μm 1T phase 2D $MoS_2$ films to each beam (total film weight of 1.6 mg). To demonstrate vertical lifting, a 265 mg weight was suspended to the ISC bimorph actuator, and initiated charging and discharging cycles. It can be seen from the images in FIG. 5C that the 1T $MoS_2$ actuator is able to lift more than 150 times of its own weight. The inventor measured hundreds of cycles and found that the actuation remained stable. The energy density of the ISC bimorph actuator, as obtained by taking buoyancy, spring and friction forces into account gravitational, was found to be ~6 kJ/m³. The work density can be increased further by judiciously increasing the $MoS_2$ layer thickness, decreasing the thickness of Kapton layer, or using a more compliant substrate.

Experimental Setup

FIG. 3 graphically depicts characteristics and use of metallic $MoS_2$ films. Specifically, FIG. 3 depicts an experimental setup to characterize and measure actuation in accordance with metallic $MoS_2$ films. The images (a)-(j) of FIG. 3 are as follows: (a) Scanning electron microscope image of restacked 1T phase 2D $MoS_2$ film. (b) The electrochemical system consists of working actuator electrode along with counter and reference electrodes submerged in 0.5M $H_2SO_4$. (c) Images of curvature induced by charge intercalation in free standing (i.e. no Kapton beam) 1T phase $MoS_2$ film on gold (where the scale bar represents 1 cm). (d) Schematic showing test strips comprising 25 um Kapton having disposed thereon 0.1 um Au and then 3 um $MoS_2$. (e) photos of actuation in forward and backward direction by modulation of electrode potential between −0.3 to +0.3V. The numbers correspond to Kapton beam position as shown in schematic (d).

Charging of the film (position 1) induces curvature of the Kapton beam to the left due to volume expansion from intercalation. Position 3 corresponds to the contraction of the film due to discharge, leading to curvature in the opposite direction. (f) Curvature versus potential data from charging and discharging of 1T phase 2D $MoS_2$ film. (g), (h) Curvature and charge versus the applied potential, respectively. (i) Curvature due to charge intercalation. (j) Actuation at different cycling frequencies, demonstrating actuation over a range of frequencies.

To track the displacement and bending curvature, one end of the actuator was clamped as working electrode and the other end dipped vertically in a rectangular glass container filled with the electrolyte, 0.5M $H_2SO_4$. Then, the actuator electrodes were electrochemically induced by applying triangular or square wave potential (−0.3 V to 0.3 V) with respect to calomel reference electrode in three electrodes configuration via Multistat (Solartron 1470). The free end displacement and the resolved bending degree of the actuator were recorded by charge coupled device (Canon 60D) as shown in FIG. 3. Change in the electrode curvature was observed with respect to electrochemical response with a resolution of 0.0001 $mm^{-1}$.

Electrochemical measurements were conducted using a Solartron Multistat 1470 with three-electrode cell configuration in 0.5 M $H_2SO_4$ electrolyte solution. Saturated calomel electrode and platinum electrode were used as reference and counter electrode respectively. Alternatively, a graphite rod was used as counter electrode for stability test. Triangular wave potential was applied on working electrode and cyclic voltammetry data were collected in the range of −0.3 V and 0.3 V vs. SCE with frequencies from 0.005 Hz to 1 Hz. The potential ranges were chosen to avoid hydrogen evolution (HER) at low potentials and the oxidation of $MoS_2$ at high potentials. The electrochemical analyses were conducted in a rectangular chamber as shown in to prevent the diffraction related errors. The one end of the working electrode was clamped and dipped in the electrolyte filled rectangular chamber. And the other end freely moved to perform linear actuation measurements and the bending movement was recorded by charge coupled device (Canon 60D). Any slight change at the electrode curvature detected in a resolution of 0.0001 $mm^{-1}$ curvature change with a frequency of 0.005 Hz to 30 Hz.

Figure 4:
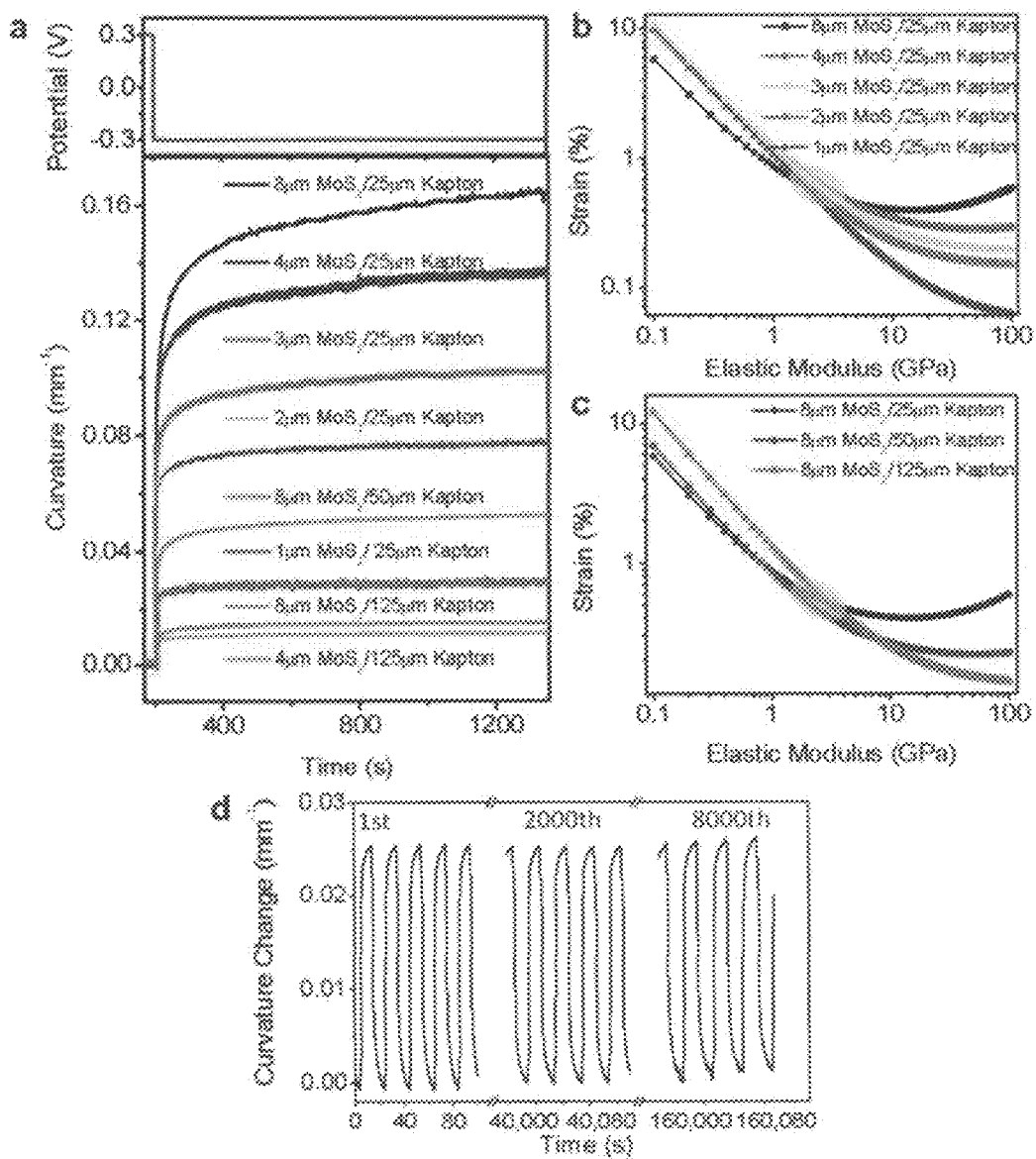
FIG. 4 graphically depicts measurements of strain and in-plane modulus using a beam bending model of various 1T phase 2D $MoS_2$ nanosheet electrodes.

FIG. 4 graphically depicts measurements of strain and in-plane modulus using a beam bending model of various 1T phase 2D $MoS_2$ nanosheet electrodes. The images (a)-(d) of FIG. 4 are as follows: (a) Curvature of Kapton beam with varying thicknesses induced by 1T phase 2D $MoS_2$ nanosheet electrodes of varying thicknesses. The upper panel shows the potential profile used for charging. (b) Calculated values of strain versus elastic modulus for 25 Kapton beam and variable thickness $MoS_2$ films. (c) Calculated strain versus elastic modulus values for constant $MoS_2$ film thickness and variable thickness of Kapton beam. The shaded regions shown in (b) and (c) are cross over points that give values of strain and elastic modulus of $MoS_2$ film. The strain can be seen to range from 0.4%-0.8% and in-plane modulus varies from 2-4 GPa. The uncertainty in strain based on thickness and elastic modulus using nanoindentation variations is approximately 10%. (d) Cycling stability of $MoS_2$ coated Kapton bimorph. The bimorph exhibited stable continuous actuation for the three days it was tested.

Multilayer Bending Beam Model

Figure 5:
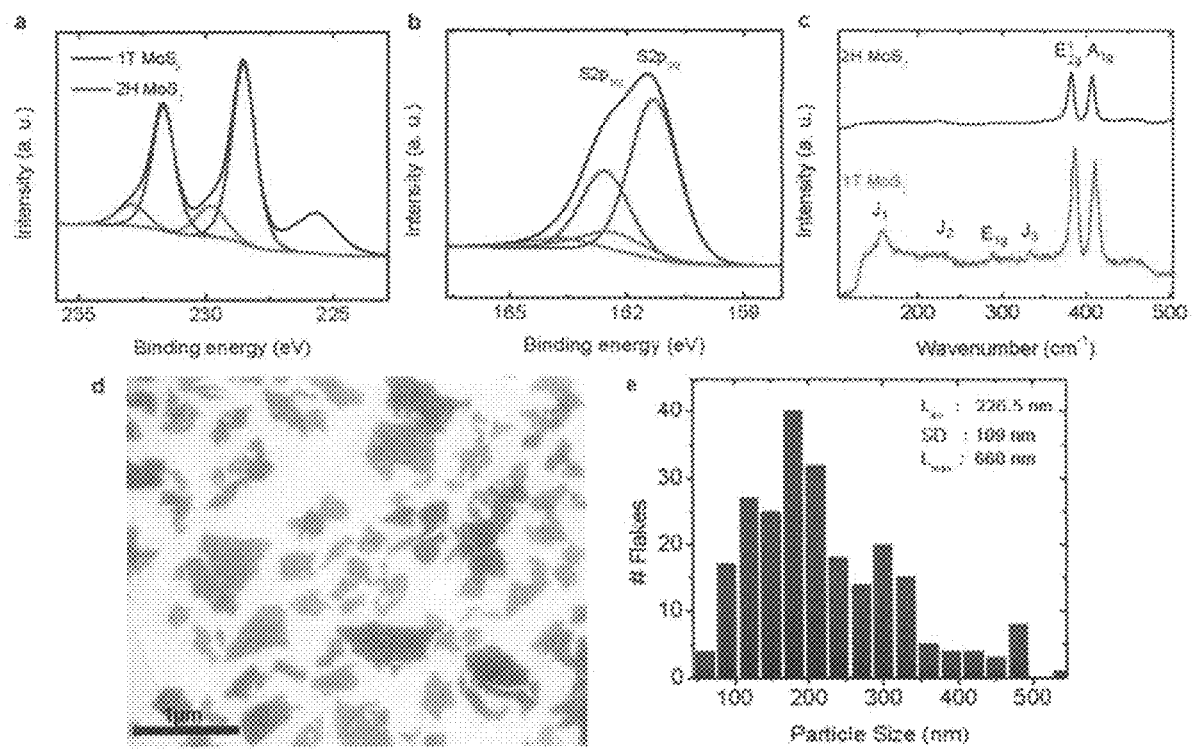
FIG. 5 graphically depicts a structural characterization of 1T phase $MoS_2$ nanosheets of an actuator according to one embodiment.

Typical bending motion of multilayer beam due to active layer expansion/contraction is shown in ED FIG. 5. It is assumed that the deformation is quasi-static so that the observed macroscopic deformation can be represented by elastic strains per the liner theory of elasticity. The lateral expansion or contraction of the active layer creates a surface stress at the interface leading a bending deformation on the beam. The corresponding strain distributions along the bent beam cross section varies, where tensile strains are at the convex surface, compressive strain at the concave surface, respectively, and there is zero strain at the neutral plane. The bending strain can be calculated from the normalized difference in the circumferences at a distance from the neutral plane from:

$$\varepsilon_0(z) = \varepsilon_0 + \frac{c_z - c_0}{c_0} = \varepsilon_0 + \frac{2\pi(R+z) - 2\pi R}{2\pi R} \quad (V.1)$$

and $$\varepsilon_0(z) = \varepsilon_0 + \frac{z}{R} = \varepsilon_0 + \kappa z \quad (V.2)$$

where $\varepsilon_0$ is the initial strain at $z=0$, R is the radius of the bent film, c is the corresponding circumference for the radius, $\kappa$ is the bending curvature and $z$ is the distance from the neutral plane. And the stress is given by:

$$\sigma = E\varepsilon = E(\varepsilon_0 - z\kappa - \alpha) \quad (V.3)$$

where $\alpha$ is the strain induced by intercalation.

The bending force (F) and moment (M) can be calculated by integrating the stress along the cross section. The force and moment are given by:

$$F = \int_0^h \sigma dz = \int_0^h E(\varepsilon_0 - z\kappa - \alpha) dz \quad (V.4)$$

and $$M = \int_0^h \sigma z dz = \int_0^h E(\varepsilon_0 - z\kappa - \alpha) z dz \quad (V.5)$$

The position of the neutral plane for multilayers depending on the mechanical and geometric properties of each layer. Therefore, the relation between curvature and induced strain is more complicated. The approach followed now described.

In the equilibrium state, the total force and moment are zero for the bent beam. Considering $\int Edz=A$, $\int Ezdz=B$, $\int Ez^2 dz=D$, the force and moment can be written as:

$$A\varepsilon_0 - B\kappa = F\alpha, \quad (V.6)$$

and, $$B\varepsilon_0 - D\kappa = M\alpha, \quad (V.7)$$

where A is the extensional stiffness, B is bending-extension coupling stiffness and D is bending stiffness. The relation between curvature and induced strain for a multi-layer beam can be obtained by integrating the force and moment equations as a function of the thickness and Young's modulus.

For a bilayer beam, the curvature is given by $$\kappa = \frac{6m_2n_2(1+m_2)(\alpha_1-\alpha_2)}{h_1(1+4m_2n_2+6m_2^2n_2+4m_2^3n_2+m_2^4n_2^2)} \quad (V.8)$$

with $m_i = h_i/h_1$, $n_i = E_i/E_1$, h is the layer thickness and E is the elastic modulus.

For trilayer beam, the curvature is $$\kappa = \frac{6(X_{12}+X_{13}+X_{23})}{h_1(1+Y_2+Y_3+Y_{23})} \quad (V.9)$$

where, $$X_{12} = m_2 n_2 (1+m_2)(\alpha_1-\alpha_2) \quad (V.10)$$

$$X_{13} = m_3 n_3 (1+2m_2+m_3)(\alpha_1-\alpha_3) \quad (V.11)$$

$$X_{23} = m_2 n_2 m_3 n_3 (m_2+m_3)(\alpha_2-\alpha_3) \quad (V.12)$$

and, $$Y_2 = 4m_2 n_2 + 6m_2^2 n_2^2 + 4m_2^3 n_2 + m_2^4 n_2^2 \quad (V.13)$$

$$Y_3 = 4m_3 n_3 + 6m_3^2 n_3 + 4m_3^3 n_3 + m_3^4 n_3^2 \quad (V.14)$$

$$Y_{23} = m_2 m_3 n_3 [(4m_2^2 + 6m_2 m_3 + 4m_3^2)n_2 + 12(1+m_2 m_3)] \quad (V.15)$$

Since only one active layer contributes to actuation, the curvature for a three-layer electrochemical actuator can be represented as, $$\kappa = \frac{-6m_3 n_3 [1+2m_2+m_3+m_2 n_2(m_2+m_3)]}{h_1(1+Y_2+Y_3+Y_{23})} \alpha_3 \quad (V.16)$$

The model used assumes no appreciable space charge at the interface of the electrode and the electroactive layer. Since the model was used to compare the performance of the actuators with each other on a relative basis, the said assumption has no impact on the evaluation and assessment of actuator performance.

The Stoney Model

The thin film approximation assumes that the substrate is appreciably thicker that the film (t1>>t2) which ensures that the film is under a plane-stress state of stress (2D). In other words, the out-of-plane normal stress is zero as there are no traction forces on the surface of the film. However, the state of strain in the film is still 3D. Also, the thicknesses of each layer are assumed to be much smaller than the lateral dimensions. Secondly, the material is homogenous, isotropic, and linearly elastic. Thirdly, all shear stresses and strain are assumed to vanish making the Cartesian coordinate system fundamentally the so-called principal axes. Finally, rotations and strains are infinitely small. Here, in-plane strain ($\varepsilon_\parallel$) is related to the out-of-plane strain ($\varepsilon_\perp$) via $\nu\varepsilon_\perp = -\varepsilon_\parallel$, where $\nu$ is the Poisson's ratio, and is given by $\nu \approx -0.5(E_\perp/E_\parallel)$ with $E_\parallel$ and $E_\perp$ as the elastic in-plane and out-of-plane elastic moduli, respectively. It follows from the Hooke's law that the stress in the film is related to the strain as via:

$$\sigma_1 \approx E_1' \Delta\varepsilon_0 \quad (V.17)$$

where $\Delta\varepsilon_0$ is the strain induced by the substrate. The curvature of a freely bent bilayer film can be expressed with strain mismatch as:

$$K = \frac{6E_2' t_2}{E_1' t_1^2} \Delta\varepsilon_0 \quad (V.18)$$

Then the residual force can be calculated with Stoney approach by neglecting the thinner layer, $$\sigma_{St} = \frac{E'_1 t_1^2}{6 t_2} K \quad (V.19)$$

where $E_1'$ is the biaxial modulus of the first layer, $\sigma_{St}$ is the interfacial stress, $t_1$ and $t_2$ are thicknesses of each layer and K is the curvature.

Work Density Calculations

The volumetric ($W_v$) and gravimetric ($W_g$) work densities of single layer and free restacked 1T-MoS2 film were calculated using:

$$W_v = \frac{E\varepsilon^2}{2} \quad (V.20)$$

$$W_g = \frac{E\varepsilon^2}{2\rho} \quad (V.21)$$

In constrained systems such as bilayer beam, the active material cannot freely strain under the imposed state of stress (plane stress). The interfacial traction creates a bending moment that deflects the beam. Then, the work (W) in the bending beam is determined by the product of bending moment M and bending angle θ, which can be obtained from the bending curvature and the actuator length. The curvature can be represented by the ratio of bending moment (M) to the bending stiffness (EI) according to Euler beam theory via $$W = \frac{M\theta}{2} = \frac{M\kappa L}{2} \quad (V.22)$$

with $$\kappa = \frac{M}{EI}, \quad (V.23)$$

resulting in $$W = \frac{M^2 L}{2EI} \quad (V.24)$$

By integrating previously constructed moment values for multilayer actuator, the moment is:

$$M = \frac{E_1 b h_1^3 (1 + Y_2 + Y_3 + Y_{23})}{2} \quad (V.25)$$

$$(\alpha_1 + (m_2^2 + 2m_2)n_2\alpha_2 + (m_2^2 + 2m_3(1+m_2))n_3\alpha_3)$$

and the bending stiffness:

$$EI = \frac{E_1 b h_1^3 (1 + Y_2 + Y_3 + Y_{23})}{12(1 + m_2 n_2 + m_3 n_3)} \quad (V.26)$$

Calculation of Gravimetric and Volumetric Capacitances of Electrode

The specific capacitances were calculated from cyclic voltammetry plots using the following equation:

$$C_g = \frac{\int I dV}{vmV} \quad (V.27)$$

$$Cv = C_g \times \rho \quad (V.28)$$

where Cg is the gravimetric capacitance (F/g), Cv is the volumetric capacitance (F/cm3), v is the scan rate (V/s), m is the mass (g), V is the potential range, and ρ (g/cm3) is the density of restacked MoS2. The density (g/cm3) of restacked MoS2 was determined from the weight of the electrode and the volume of the $MoS_2$ films.

The energy density and power density of the supercapacitors were calculated according to the following equations:

$$E(Wh/g) = \frac{0.5 C_T \Delta V^2}{3600} \quad (V.29)$$

$$E_v(Wh/cm^3) = E \times \rho \quad (V.30)$$

$$P(W/g) = \frac{E \times 3600}{t_{discharge}} \quad (V.31)$$

$$P_v(W/cm^3) = P \times \rho \quad (V.32)$$

where CT is the total capacitance of the two-electrode cell, ΔV is the effective potential range during discharging process, $t_{discharge}$ is the discharging time (s), p is the density of the electrode, E is the energy density while P is the power density.

Inverted S-Beam Calculations

When the mass was hung, the ISC actuator stretched vertically, similarly to a spring where the displacement is proportional to the applied force as shown in Extended Data FIG. 6. In this configuration, the system is subjected to gravitational forces, buoyancy, spring force and friction force. At equilibrium, these forces balance out and any additional force will disturb the equilibrium until it reaches the new equilibrium state. Gravitational force and buoyancy were calculated from the mass and volume of the hung weight. These forces were balanced by the spring force and the spring constant was derived from the displacement.

The spring force (F) is given by:

$$F = -kx \quad (V.33)$$

whereas the work is given by, $$W = \int F(x) dx \quad (V.34)$$

The ISC actuator was electrochemically actuated without the mass and a reversible actuation was observed with 3.6 mm displacement. The corresponding electrochemically induced force and work were calculated by using the spring constant. Then the mass loaded ISC actuator was electrochemically driven and corresponding force and work were calculated.

The electromechanical coupling factor (k2) is the ratio of mechanical work to stored energy density which is given by $$k^2 = \frac{\frac{1}{2}E\varepsilon^2 V^2}{\frac{1}{2}CV^2\rho}. \quad (V.35)$$

The inventor used the above equation for assessing the electromechanical energy conversion of the actuators. By dividing the generated mechanical work with the stored energy, the electromechanical coupling factor (k2) were calculated and were found to be 0.5-0.6.

Bending Mechanism of the 1T MoS2 Bimorph Actuator

Frequency values of electrochemical actuators were compared where the highest strain was observed. The typical convention in defining the frequency intervals for actuators depends on the actuator type. For instance, piezoelectric-based electromechanical actuators that operate near a fundamental mode of resonance are typically considered low frequency for <100 kHz, intermediate frequency for ~400-500 kHz, and high frequency for >10 MHz. For electrochemical actuators, which operate quasi-statically, consider 1-100 Hz as high, 0.1-1 Hz as moderate and <0.1 Hz as low frequency. The work frequency refers to the frequency at which highest strain is observed.

Nanoindentation

The inventor measured the modulus of 3 μm and 8 μm MoS$_2$ films by nanoindentation in dry, wet, and charging/discharging conditions and found the modulus to be comparable or higher than what was measured by beam bending. The inventor made hundreds of measurements and thus the presented values represent the average values.

FIG. 5 graphically depicts a structural characterization of 1T phase MoS$_2$ nanosheets of an actuator according to one embodiment. The images (a)-(e) of FIG. 5 are as follows: (a) High-resolution X-ray photoelectron spectrum from the Mo 3d region (a) and (b) the S2p region of as-exfoliated 1T MoS$_2$ film. 1T and 2H phases are indicated as blue and red curves respectively. (c) 1T phase MoS$_2$ has distinctive Raman peaks (J$_1$, J$_2$ and J$_3$ peaks at 156 cm$^{-1}$, 226 cm$^{-1}$ and 333 cm$^{-1}$) in addition to two main Raman modes of the in-plane mode: and the out-of-plane mode: A$_{1G}$. The 1T phase of MoS$_2$ was identified from the presence of E$^1_g$, J1, J2 and J3 peaks. (d) The MoS$_2$ flake size analyses were conducted by counting the individual flakes from multiple SEM images. The size of the exfoliated monolayer MoS$_2$ flakes varies with 50 nm to 700 nm. The average flake size is 226.5 nm with 109 nm standard deviation.

FIG. 6 graphically depicts a relationship between capacitance and curvature of an actuator according to one embodiment. The images (a)-(d) of FIG. 6 are as follows: (a) and (b) Capacitance-Voltage curves at different scan rates for 1T phase MoS$_2$ film electrodes. The similarity in behaviour at different scan rates indicates that charging and discharging can be done slowly or rapidly allowing stable actuation at varying frequencies. (c), (d) Electrochemical actuation and capacitance with frequency. (c) Curvature change (blue points) and capacitance (red points) as a function of frequency. (d) Curvature vs capacitance where the dotted line represents a linear fit at low scan rates. The deviation from this line represents the influence of drag forces from the liquid.

FIG. 7 graphically depicts the influence of electrochemical parameters on curvature of an actuator according to one embodiment. The images (a)-(f) of FIG. 7 are as follows: (a) Electrochemical actuation and capacitance with applied potential. (b) Curvature change induced by square wave potential at different potential ranges. (c) The curvature change induced by triangular wave potential at different potentials. (d) Capacitance—Voltage curves with expanding electrochemical potential window. (e) Curvature as a function of electrochemical potential. (f) Capacitance versus curvature.

Figure 8:
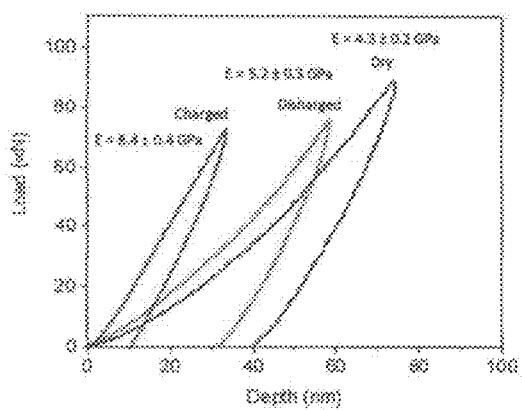
FIG. 8 graphically depicts typical nanoindentation loading vs. depth traces for of 8 μm thick $MoS_2$ film according to one embodiment.

FIG. 8 graphically depicts typical nanoindentation loading vs. depth traces for of 8 μm thick MoS$_2$ film according to one embodiment. The elastic modulus values of dry, charged, and discharged states of the film are shown. The results of the 3 μm thick films were similar to the 8 μm thick films.

Figure 9:
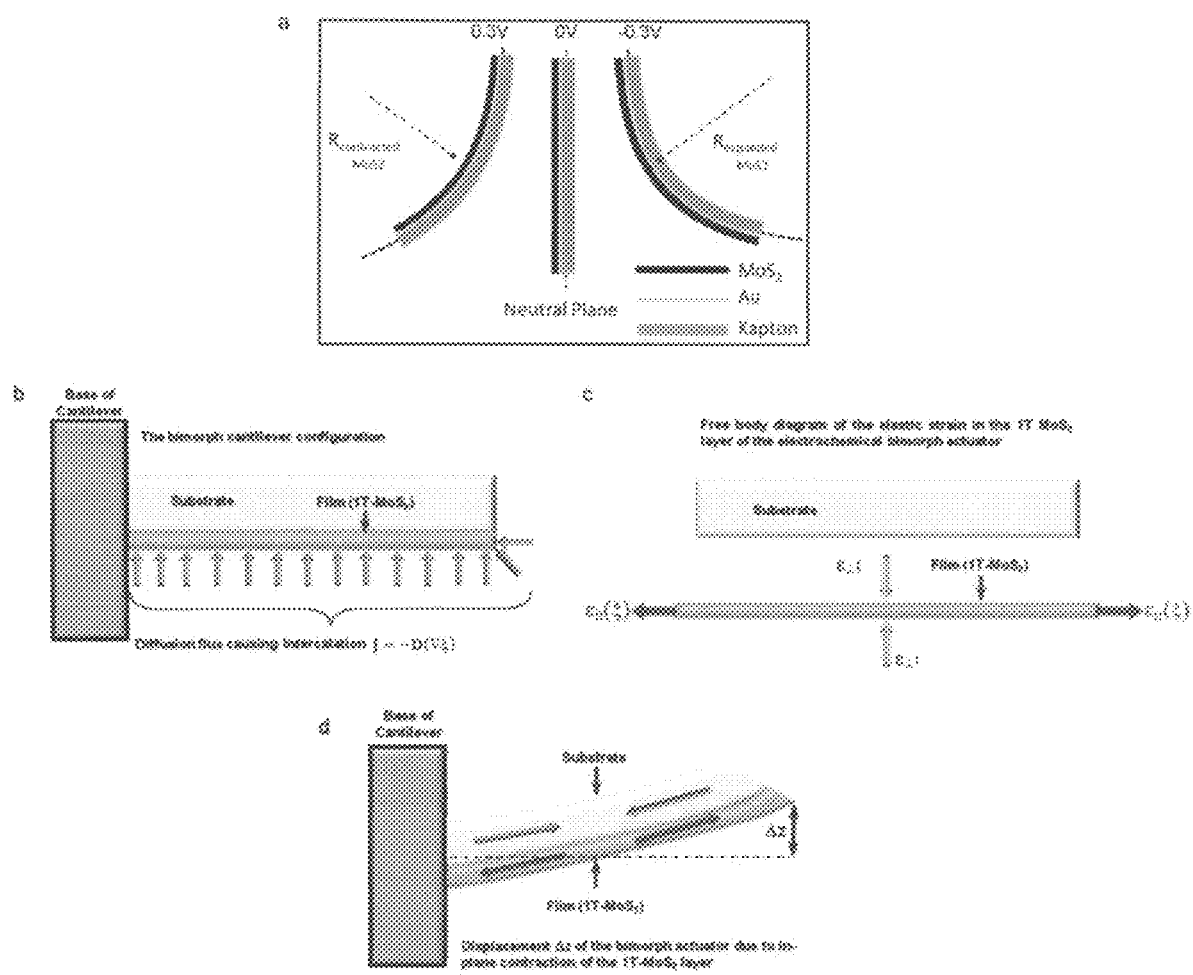
FIG. 9 graphically depicts actuation behavior in accordance with a beam bending model according to one embodiment.

FIG. 9 graphically depicts actuation behavior in accordance with a beam bending model according to one embodiment. The images (a)-(d) of FIG. 9 are as follows: (a) Schematic summarizing the bending behavior of the 1T-MoS$_2$ based bimorph actuator as a function of voltage polarity. (b) Cantilever actuator configuration representing the mechanics of electrochemical actuation due to the diffusion flux (J) of intercalating species into the 1T MoS$_2$ film of the bimorph structure under isothermal conditions. The constancy of temperature makes the diffusivity (D) of the intercalating species in 1T MoS$_2$ a constant. Here, the ingress of the intercalating species is through all surfaces that are exposed to the liquid medium. The driving force for the ingress is the concentration gradient of the intercalating species ($\nabla\xi$) that is formed between the 1T MoS$_2$-liquid interface and the interior of the 1T MoS$_2$ film. (c) Free body diagram of the bimorph showing the elastic (recoverable) strains developed in 1T MoS$_2$ film due to the intercalation process. The intercalating species cause the 1T MoS$_2$ film to contract in the direction perpendicular to the normal surface of the film, resulting in a compressive out-of-plane strain $\varepsilon_\perp$. The compressive $\varepsilon_\perp$ induces an in-plane expansion as represented by the tensile in-plane strain $\varepsilon_\parallel$, both of which are related via $\varepsilon=-2(E_\parallel/E_\perp)\varepsilon_\parallel$ due to plane state of stress[32,33], where $E_\parallel$ and $E_\perp$ are the in-plane and out-of-plane elastic moduli, respectively. The ($\varepsilon_\parallel/\varepsilon_\perp$) ratio represents the Poisson's ratio. The normal in-plane strains are assumed to be isotropic, while the in-plane shear strain presumed completely relieved both as a consequence of in-plane rotation of 1T MoS$_2$ nanosheets comprising the film are random around the normal axis, i.e. mosaic structure. (d) The resultant deformation of the cantilever bimorph actuator. The tensile in-plane strain $\varepsilon_\parallel$ in the 1T MoS$_2$ film induces deformation in the substrate due traction at the film-substrate interface, i.e. clamping of the electrochemically active film by the substrate. The consequence is a tip displacement ($\Delta z$) of the bimorph actuator (the system) that does work on the surroundings (the inertial weight). The inverse bell-shaped bimorph actuator can be thought of as a back-to-back bimorph cantilever actuators that are "welded" at the tip where maximum ($\Delta z_{max}$) deflection occurs.

Planar and Non-Planar Embodiments

To simplify the discussion of the various embodiments, these embodiments have generally been described within the context of a planar embodiment such as a layered structure wherein a plurality of 1T phase 2D MoS$_2$ nanosheet structures are positioned on one or more flexible substrates formed into operating components of an actuator configured to be immersed in an appropriate liquid electrolyte. Other embodiments contemplate thicker stacks of 1T phase 2D MoS$_2$ nanosheet structures such that relatively non-planar structures are formed, such structures actuating via expansion, contraction and the like in one or more two and three dimensions.

In both planar and non-planar embodiments, one or more substrate materials may be used to support and/or configure the spatial positions of the nanosheets. The one or more substrate materials may comprise rigid structures to which nanosheet structures are adhered to or otherwise urged toward an operative physical disposition via direct physical connection, electromagnetic forces, fluid surface tension and/or other mechanisms.

In both planar and non-planar embodiments, the nanosheet structures may themselves physically cooperate to support and/or configure their respective spatial position such that the interactions therein occur in the manner described above. In various embodiments multiple nanosheet structures may be operatively disposed proximate to each other, one inside the other and so on.

Thus, in various other embodiments, the term "layer" as used in the above discussion may be replaced by the terms "region" or "area" or "portion" to indicate thereby such that both planar and non-planar structures, or portions thereof, are contemplated to be within the scope of the instant disclosure.

Various embodiments provide an actuator including a flexible substrate having a surface comprising one or more active regions, each of the active regions having disposed thereon an electrochemically active film comprising a plurality of 1T phase 2D transition metal dichalcogenides (TMD) nanosheets; the electrochemically active film imparting a first force upon the flexible substrate in response to electrochemical charging of ions in the 2D TMD nanosheets; the electrochemically active film imparting a second force upon the flexible substrate in response to electrochemical discharging of ions in the 2D TMD nanosheets; the first and second forces imparted to the flexible substrate each being sufficient to displace the flexible substrate.

The active regions may have disposed there on a plurality of the electrochemically active films to form thereby a three dimensional structure configured to impart additional first and second forces upon the flexible substrate in response to the electrochemical charging and discharging of ions in the 2D TMD nanosheets.

The TMD nanosheets may comprise $MoS_2$ nanosheets or nanosheets formed using similar materials.

The flexible substrate may comprise a polymer substrate and the electrochemically active film may comprise a conductive layer having disposed thereon the plurality of 1T phase 2D TMD nanosheets. The electrochemical charging induces intercalation of ions within the plurality of 1T phase 2D TMD nanosheets.

The actuator may be in electrochemical communication with an electrolyte material, where electrochemical charging is induced via a first electric potential between the electrochemically active film and the electrolyte material, and the electrochemical discharging is induced via a second electric potential between the electrochemically active film and the electrolyte material.

The electrolyte material may comprise an electrolytic fluid wherein the actuator is immersed in the electrolytic fluid. The electrolytic fluid may have a pH between 14 and 1.

The electrolytic fluid may comprise an electrolytic fluid of a battery, capacitor, or the bodily fluid of an animal or human, where the actuator is operative to cause an indication of a condition of the electrolytic fluid or some other parameter within the battery, capacitor, or the bodily fluid of an animal or human.

The electrolyte material may comprise an electrolytic solid or semi-solid or slurry. The actuator may be encased in the electrolytic solid or semisolid or slurry.

The actuator may comprise one of a plurality sub-actuators forming a compound actuator to configured to impart a desired force upon an object, wherein the total force imparted to an object is formed by the parallel application of the force of each of the sub-actuators, where each of the sub-actuators may comprise a respective or common substrate having a surface comprising one or more active regions, each of the active regions having disposed thereon an electrochemically active film comprising a plurality of 1T phase 2D transition metal dichalcogenides (TMD) nanosheets, at least one of the substrate and the plurality of 1T phase 2D TMD nanosheets in mechanical communication with the object; the electrochemically active film imparting a first force upon the object in response to electrochemical charging of ions in the 2D TMD nanosheet; the electrochemically active film imparting a second force upon the object in response to electrochemical discharging of ions in the 2D TMD nanosheet.

Thus, specific devices and systems utilizing nanostructures to engineer various actuators have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In addition, the references listed herein are also part of the application and are incorporated by reference in their entirety as if fully set forth herein.

What is claimed is:

1. An actuator, comprising:
   a flexible substrate having a surface comprising a plurality of active regions, each of said active regions having disposed thereon an electrochemically active film comprising a plurality of 1T phase 2D transition metal dichalcogenides (TMD) nanosheets;
   said electrochemically active film imparting a first force upon the flexible substrate in response to electrochemical charging of ions in said 2D TMD nanosheets;
   said electrochemically active film imparting a second force upon the flexible substrate in response to electrochemical discharging of ions in said 2D TMD nanosheets;
   said first and second forces imparted to said flexible substrate each being sufficient to displace said flexible substrate.

2. The actuator of claim 1, wherein said TMD nanosheets comprise MoS2 nanosheets.

3. The actuator of claim 1, wherein said flexible substrate comprises a polymer substrate and said electrochemically active film comprises a conductive layer having disposed thereon said plurality of 1T phase 2D TMD nanosheets.

4. The actuator of claim 1, wherein said electrochemical charging induces intercalation of ions within said plurality of 1T phase 2D TMD nanosheets.

5. The actuator of claim 1, wherein:
said actuator is in electrochemical communication with an electrolyte material;
said electrochemical charging is induced via a first electric potential between said electrochemically active film and said electrolyte material; and
said electrochemical discharging is induced via a second electric potential between said electrochemically active film and said electrolyte material.

6. The actuator of claim 5, wherein said electrolyte material comprises an electrolytic fluid and said actuator is immersed in said electrolytic fluid.

7. The actuator of claim 6, wherein said electrolytic fluid has a pH between 14 and 1.

8. The actuator of claim 6, wherein said electrolytic fluid comprises an electrolytic fluid of a battery.

9. The actuator of claim 6, wherein said electrolytic fluid comprises an electrolytic fluid of a capacitor.

10. The actuator of claim 6, wherein said electrolytic fluid comprises an electrolytic bodily fluid of an animal or human.

11. The actuator of claim 5, wherein said electrolyte material comprises an electrolytic solid or semi-solid or slurry, and said actuator is encased in said electrolytic solid or semisolid or slurry.

12. The actuator of claim 1, wherein each of said active regions having disposed there on a plurality of said electrochemically active films to form thereby a three dimensional structure configured to impart additional first and second forces upon the flexible substrate in response to said electrochemical charging and discharging of ions in said 2D TMD nanosheets.

13. The actuator of claim 1, wherein said actuator comprises one of a plurality sub-actuators forming a compound actuator to configured to impart a desired force upon an object.

14. A compound actuator comprising a plurality of actuators arranged to impart a desired force upon an object, each of said actuators comprising:
a substrate having a surface comprising a plurality of active regions, each of said active regions having disposed thereon an electrochemically active film comprising a plurality of 1T phase 2D transition metal dichalcogenides (TMD) nanosheets, at least one of said substrate and said plurality of 1T phase 2D TMD nanosheets in mechanical communication with said object;
said electrochemically active film imparting a first force upon the object in response to electrochemical charging of ions in said 2D TMD nanosheet;
said electrochemically active film imparting a second force upon the object in response to electrochemical discharging of ions in said 2D TMD nanosheet.

15. The compound actuator of claim 14, wherein said TMD nanosheets comprise MoS2 nanosheets.

16. An actuator, comprising:
a substrate having a surface comprising a plurality of active regions, each of said active regions having disposed thereon an electrochemically active film comprising a plurality of 1T phase 2D MoS2 nanosheets, at least one of said substrate and said plurality of 1T phase 2D MoS2 nanosheets in mechanical communication with an object;
said electrochemically active film imparting a first force upon the object in response to electrochemical charging of ions in said 2D MoS2 nanosheet;
said electrochemically active film imparting a second force upon the object in response to electrochemical discharging of ions in said 2D MoS2 nanosheet.

17. The actuator of claim 16, wherein said flexible substrate comprises a polymer substrate and said electrochemically active film comprises a conductive layer having disposed thereon said plurality of 1T phase 2D MoS2 nanosheets.

18. The actuator of claim 16, wherein said electrochemical charging induces intercalation of ions within said plurality of 1T phase 2D MoS2 nanosheets.

19. The actuator of claim 16, wherein said actuator is in electrochemical communication with an electrolyte material, said electrochemical charging is induced via a first electric potential between said electrochemically active film and said electrolyte material, and said electrochemical discharging is induced via a second electric potential between said electrochemically active film and said electrolyte material.

20. The actuator of claim 19, wherein said electrolyte material comprises an electrolytic fluid and said actuator is immersed in said electrolytic fluid.

* * * * *